Nov. 3, 1959     C. A. DE GIERS     2,911,576
THREE-DIMENSIONAL LATTICE-TYPE CAPACITOR FOR TANK GAUGING
Filed July 31, 1957     2 Sheets-Sheet 1

INVENTOR.
CLARENCE A. de GIERS
BY
Paul M. Phillips
ATTORNEY

INVENTOR.
CLARENCE A. de GIERS
BY
Paul M. Phillips
ATTORNEY

United States Patent Office 2,911,576
Patented Nov. 3, 1959

2,911,576
THREE-DIMENSIONAL LATTICE-TYPE CAPACITOR FOR TANK GAUGING

Clarence A. de Giers, Roslyn, N.Y., assignor to The Liquidometer Corporation, Long Island City, N.Y., a corporation of Delaware Application July 31, 1957, Serial No. 675,312

11 Claims. (Cl. 317—246)

This invention relates to a three-dimensional lattice-type capacitor for tank gauging, and more particularly to a type of capacitor made up of two electrodes, each of which is formed as a three-dimensional type lattice of wire-like elements, wherein each of the electrodes occupies an entire volumetric space in a container or tank which is to be gauged by the capacitor. The capacitor is so constructed and arranged that it will have substantially the same capacitance for each unit of volume of the predetermined volumetric space occupied by the capacitor, so that the capacitance of the capacitor will be substantially independent of the attitude of the container and will be unchanged, for example, by positioning the container at any of the different possible attitudes it might assume.

It has been customary for some time to place capacitors in tanks of non-gaseous fluids so as to determine the amount of the fluid therein. Such capacitors, while in some instances consisting of a pair of more or less parallel plates, have usually consisted of concentric tubes, parts at least of which were effective as the electrodes of the capacitor. As is well known in this art, the electrical capacitance of a capacitor which may, for example, extend vertically in a tank to be gauged, is a joint function of the level of the fluid being gauged and of the dielectric constant thereof. Such capacitors have been quite commonly used and have been calibrated sometimes in terms of volume and sometimes in terms of weight, particularly when used in gauging the amount of fuel in the fuel tanks of an aircraft. It has also been proposed to use capacitors of this type with non-liquid materials, as long as such material flowed as a fluid and acted in effect as a fluid. It has also been proposed to use such capacitors for sensing electrically conducting fluids, but in such circumstances it is necessary to coat the electrodes of the capacitors or at least one of such electrodes with a non-conducting coating of some kind.

In substantially all the prior art structures, however, there has been no wholly successful ways of overcoming differences in the indication due to changes in the attitude of the container. This is particularly necessary in the case of aircraft fuel gauges, wherein the aircraft may occupy many different attitudes from time to time and may occasionally be flown upside down, at least for short periods of time. There is a real demand, therefore, particularly for use in airplanes, in gauging the fuel tanks thereof and also in connection with gauging the amounts of liquid oxygen in an oxygen bottle carried by an airplane, for a capacitive device which can be associated with a known capacity-responsive system for indicating fluid contents, wherein the indication will be substantially independent of the attitude of the tank or container being gauged. The present invention supplies such a need.

Attempts have been made in the past to overcome irregularities of indication due to changing attitudes of a tank being gauged by capacitive means by installing a number of capacitors in different parts of a tank, each of the capacitors being substantially cylindrical as above set out, and arrangements being such that as the tank tilts, the increase in capacitance in the capacitors on one side where the depth is increased will be balanced by a decrease on the other side where the effective depth of the other side is decreased. As a practical matter, however, such proposals have not found general favor as it has been found impractical to install enough of the concentric or cylindrical-type capacitors or probes to provide a true indication of the tank contents at all attitudes. This difficulty is further augmented by the extreme changes in attitude which are encountered in modern jet fighter planes, wherein it is not at all uncommon to have a tank positioned at 90° or more away from the normal horizontal position for which the standard type capacitors of the prior art are set. The capacitor of the present invention is wholly unaffected by such changes in attitude.

Another difficulty with prior art devices is that in practice in airplane fuel tanks there is likely to be some water accumulated therein, possibly due to impurities in the fuel or possibly due to condensation from the air which replaces the fuel as it is used. In any event, the water tends to form in droplets near the bottom of the tank. As these droplets become larger, there is a tendance with standard prior art capacitors for the water to occupy the entire space between the capacitor plates (which are usually quite close together) and thus cause a short which serves practically to put the system out of operation. Even when the water does not form a complete dead short, the accumulation of water on one or both plates will change the effective distance between the plates and thus change the capacitance to such an extent that the indication afforded by the device will be erroneous. It is practically necessary in connection with the use of prior art capacitors that the plates be fairly close together in order that sufficient capacitance be afforded so as to give a desired value of capacitance to the system as a whole. With the device of the present invention, however, inasmuch as it, in effect, occupies the entire space to be gauged, the overall capacitance is sufficient even though the individual wires or wire-like elements are spaced apart by very substantial distances, for example, an inch or two. In view of this much larger spacing, the difficulty occasioned by water droplets is in effect minimized and in most installations is non-existent.

Another difficulty with prior art tank-gauging capacitors which is overcome by the device of the present invention is caused by the very irregular shape of tanks or containers which such devices may be called upon to gauge. As will be readily understood by those familiar with aircraft, the spaces available for fuel tanks are highly irregular in shape, often including parts of the wings and sometimes places in the fuselage where the shape must be made to conform to other space requirements so as to use up all available cubic space. In order to gauge such irregular volumes, and particularly in order that there may be a cumulative indication of the contents of a number of such differently-shaped spaces or tanks, it is necessary with standard prior art commercial type capacitors that one or both the plates or electrodes of such capacitors be profiled in accordance with the shape of the container in which the particular capacitor is located. This is not only expensive, but requires different profiling for each different capacitor intended for use in a different tank or even in a different part of the same tank. It must be understood that the over all net result to be attained by such profiling is that there be a given change in the electrical capacitance from any and all capacitors for each unit of volume affecting such capacitors respectively, so that as the tank changes in cross-sectional area at different levels, the capacitance change at such levels must be calculated accordingly and the plate area tailored or profiled accordingly.

The device of the present invention accomplishes the same result much more simply by providing a substantially constant density of electrode exposure in each unit of volume of the container being gauged or, in other words, by providing a substantially constant increment of capacitance for each unit of volume of the predetermined volumetric space occupied by the capacitor.

As such, the capacitors of the present invention are adapted and intended for use in gauging the non-gaseous fluid contents of tanks in airplanes, ships, tank trucks or other places wherein attitude may change more or less and wherein it is desired to obtain an accurate indication of the fluid contents independent of such change in attitude.

The device of the present invention affording all the desirable features above discussed may be summarized as comprising two electrodes, each of which is made up as a three-dimensional lattice of wire-like elements which may comprise straight wires or curved or bent wires or both and wherein, for each electrode, the wires are all electrically connected together, usually at their intersections and are arranged collectively to occupy the entire space to be gauged, the wire-like elements of one electrode being disposed generally between and out of electrical contact of the wire-like elements of the other electrode. In a preferred form of the invention, the arrangement of the wire-like elements in the two electrodes is substantially the same and the wire-like elements of one electrode are disposed substantially midway between the respectively corresponding wire-like elements of the other electrode. These wire-like elements as aforesaid constituting each of the two electrodes occupy the entire volumetric space to be gauged, while permitting free and substantially uninterrupted flow of the non-gaseous fluid through this space except for the very minor amount thereof which is occupied by the wire-like elements per se. In one form of the invention, the wire-like elements are respectively straight wires, which extend in three directions, each perpendicular to the other two, so that the elements of one electrode, for example, form the edges of rectangular prisms. In another form of the invention, each electrode comprises groups of wire-like elements formed in a plurality of parallel planes, with the elements in each of the planes arranged substantially in a honeycomb shape, in other words, as a plurality of contiguous hexagons, and the elements in each of the several planes being connected to one another by similar elements extending perpendicular to these several planes.

Means are provided in connection with all forms of the invention for holding the elements making up each electrode in substantially fixed relation to the elements making up the other electrode. According to one embodiment of the invention, such means may comprise internally arranged insulating means securing portions of one electrode to the other at a plurality of places within each three-dimensional type lattice. An arrangement of this kind could, for example, be placed inside a container wherein the container walls were of nonconducting material such as rubber and without providing additional insulation between the electrodes and the container. On the other hand, and in some relatively small installations, it may suffice to provide insulating means between outer portions of each electrode and the adjacent parts of the inside wall of the container and to rely upon the relatively rigid construction of each electrode to obviate the providing of internal insulating means securing one electrode to the other. Various combinations of these two types of insulating supports may be used as desired and as hereinafter set out.

The means for connecting the electrodes of the capacitor of the present invention to the outside of the container to be gauged may be substantially conventional, as may also be the type electrical system used as a capacitance-responsive system for indicating the contents of the container and/or for effecting any desired control in respect to such contents as is sometimes done.

The invention will be better understood from a detailed description of some preferred embodiments thereof, which are illustrated in the accompanying drawings, in which.

In accordance with the present invention, each of the two electrodes forming the capacitor is made up of wire-like elements arranged in some type of three-dimensional lattice and arranged as a whole to occupy the entire space to be gauged by the entire capacitor. This space may be the whole or some predetermined part of the interior of the container. So, for example, the capacitor including both electrodes may be arranged so as to fill the entire volumetric space in a container or some predetermined part thereof less than the whole, leaving the other part or parts to be gauged by other capacitors or other means if it is to be gauged at all. In any event, the capacitor of the present invention is adapted to gauge the fluid contents in a predetermined volumetric space occupied thereby independent of the attitude in which that volumetric space and the capacitor therein may be positioned.

Figures 1, 2:
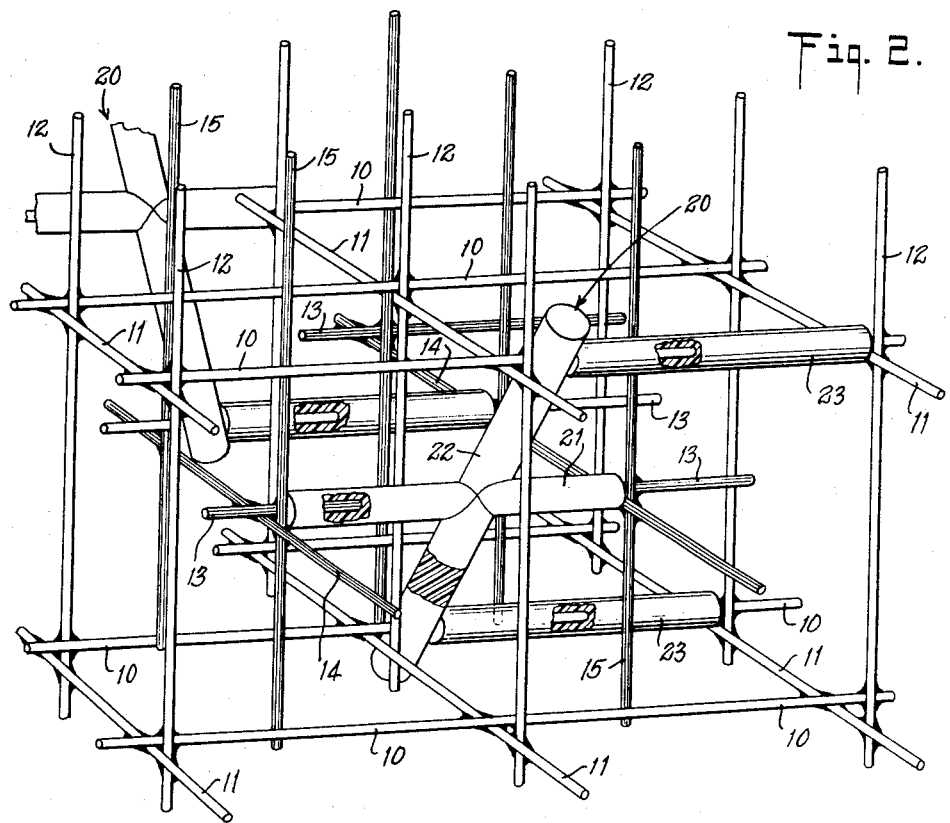
Fig. 1 is a view which may be considered as substantially in plan, illustrating one form of the invention, the wire-like elements making up one of the two electrodes being shown as relatively heavy lines and those making up the other electrode being shown as relatively light or thin lines.
Fig. 2 is a view in perspective on an enlarged scale with respect to the scale of Fig. 1, showing a capacitor substantially as illustrated in Fig. 1, but particularly illustrating a different type of internally disposed, insulating spacing means which may be used therewith.

Referring first to Fig. 1 (which is assumed to be a plan view for the purposes of this description), there is illustrated a type of capacitor in which each electrode is made up of straight wire-like elements which are preferably relatively rigid, so as to require a minimum of support, and which are arranged as shown in three groups as to each electrode, these groups including (a) a group of wires 10 which are arranged horizontally and extend from side to side as seen in this view; (b) a group of wires 11 which are also arranged horizontally (as to the capacitor) and are shown by vertically extending wires in this view; and (c) a group of wires 12 which extend vertically (as to the capacitor) and which are shown in end view only in this view, so that they would extend perpendicular to the plane of the paper as shown. It is noted that these wires are all equally spaced and it may further be assumed that the wires 10 and 11, which in the capacitor itself are both disposed in a single horizontal plane as shown (the plane of the paper), are repeated in a plurality of planes parallel to that of the paper and preferably equidistant from one another, so that the wires 10, 11 and 12 define the edges of a plurality of contiguous cubes. It is contemplated, however, that wires may be arranged as the edges of rectangular prisms (not limited to cubes) as well as other geometric shapes, such as parallelopipeds.

The other electrode, shown in this figure by relatively light lines as contrasted with the lines showing the wire-like elements 10, 11 and 12, may comprise a group of straight wire-like elements 13 respectively parallel with the elements 10, a second group of wire-like elements 14 respectively parallel with the elements 11, and a third group of wire-like elements 15 respectively parallel with the elements 12. The arrangement of the elements of the second electrode, including the wire-like elements 13, 14 and 15, is preferably substantially the same as that of the first electrode including elements 10, 11 and 12. To this end, the elements 13 and 14 are disposed in planes which are horizontal as to the electrode itself, such planes being parallel to the plane of the paper as seen in Fig. 1. Each plane including elements 13 and 14 will be positioned midway vertically between adjacent planes including the elements 10 and 11. In the same way, the vertical planes (considered from the point of view of the electrode itself) including elements 14 and 15 will be positioned midway between vertical planes (as to the capacitor) including elements 11 and 12. Similarly, the vertical planes including elements 13 and 15 will be positioned midway between the vertical planes including elements 10 and 12. Thus, as to the second electrode, the several elements 13, 14 and 15 thereof define the edges of cubes, in the center of each of which is an intersection of the elements 10, 11 and 12. In the same way, the cubes defined by elements 10, 11 and 12 will have at their centers the intersections of elements 13, 14 and 15.

It is further preferred as to each electrode that there be electrical interconnection between all the elements thereof, preferably at the several intersections of the wire-like elements, for example, by welding, brazing, soldering or merely by some assured electrical contact. Any manner of assuring that all the elements of each electrode are electrically connected together should be considered within the purview of the present invention. It is understood, of course, that the elements making up one electrode are out of electrical contact with the elements making up the other electrode, so that the electrodes may act as the plates of a capacitor in the usual way.

While the form of the invention shown in Fig. 1 and just described involves electrodes which are exactly similar to each other, it is contemplated that this exact similarity is not an absolutely essential part of the invention as long as there is a substantially uniform electrical capacitance increment for each unit of volume occupied by the two electrodes, considered collectively. Such a mathematical relationship may exist to a substantial extent with different electrodes, but wherein each electrode comprises some type of three-dimensional lattice, not necessarily exactly similar to each other.

It will further be understood that the possible variations in shape referred to in discussing the first of the two electrodes shown in Fig. 1 are equally applicable to both electrodes.

It is further contemplated that the spacing between the respectively corresponding wires of the two electrodes which is uniform as shown in Fig. 1 need not be exactly so, but may be to some extent at least non-uniform as long as there is a substantially uniform increment of capacitance for each unit of volumetric space occupied by the electrodes. Thus, the form of Fig. 1 is a preferred form of construction, rather than the only possible form.

In the form of Fig. 1 there is also illustrated what may be termed "internal" electrode positioning means, such means being wholly contained within the volumetric space occupied by the two electrodes. In this instance, the spacing means comprises a plurality of insulating members 16, each of which extends from one intersection of three of the wire-like elements 10, 11 and 12 to another intersection thereof. As a practical matter, and while it is not shown in Fig. 1, these insulating spacing elements 16 are disposed in an inclined direction so that one end, for example, as shown at 17, is on a level higher than that of the other end 18. Thus, considering the elements 10, 11 and 12 at the place at which an insulating spacing element is connected to outline the sides of a cube, the points 17 and 18 will be at diagonally opposite corners of such cube. The insulating element 16 will then also embrace the intersection of the elements 13, 14 and 15 at its midpoint at 19, which would be at the exact center of such cube. It will be understood that the insulating elements 16 will be so shaped and constructed as to embrace the intersections of three wire-like elements at each of the points 17, 18 and 19. Thus, by providing a plurality of these insulating spacing elements 16, and by using relatively rigid wire-like elements, the two electrodes may be positioned accurately with respect to each other and sufficiently rigidly held so as to accomplish their desired function as aforesaid.

The wire-like elements themselves are preferably made of some suitable metal or metallic alloy which is electrically conductive and which has sufficient structural strength by reason of its composition and of the diameter of the wire-like elements to serve the purposes for which it is used. It is contemplated that both rod-like and tube-like elements may be used as desired, although solid rod-like elements are usually preferred as they take up less space.

Referring now to the form of the invention shown in Fig. 2, there is illustrated a pair of electrodes, one of which is shown as unshaded rods, while the other is shown as shaded rods to distinguish each from the other. In this figure the two electrodes are constructed substantially as described for the form of the invention of Fig. 1, the differences between these two forms residing in the manner in which one electrode is supported from the other by insulating supporting members.

In view of the fact that the electrode structures per se are intended as shown in this view also to be substantially identical, the wire-like elements making up these electrodes are given the same reference characters (10–15 inclusive respectively). As shown in this figure, the wire-like elements 13, 14 and 15 are shown shaded to distinguish these elements and the electrode formed thereby from the elements 10, 11 and 12, and the electrode formed by these last named elements.

As shown in Fig. 2, there is provided another and somewhat more complicated means for holding the two electrodes in spaced relation to one another, this means also being what may be termed "internal" in character as distinguished from an "external" type holding means which will be described with respect to Fig. 4. This spacing means includes an element of substantially X-shape or as it is sometimes called "cross-shaped," this element being shown generally at 20. The elements 20, or for that matter, the spacer elements 16 in Fig. 1, may be made up of any suitable insulating material having the desired strength such, for example, polytetrafluoroethylene which is sold under the trade name "Teflon" or trifluorochlorethylene, sold under the trade name of "Kel-F." Either of these materials or other material reasonably equivalent thereto in electrical insulating ability and mechanical strength may be used in any of the ways herein described for insulating material as these materials are quite inert with respect to most fluids which may be contained in tanks or containers to be gauged.

Spacing element 20 comprises a horizontal portion 21 which may be of tubular form and which is adapted to surround one of the horizontally disposed wire elements 13 and to extend axially of such wire completely between the adjacent vertically disposed wire elements 15, so as to position this element 21 in a predetermined fixed position axially of this wire element 13. The other portion forming a part of the cross-shaped insulating means 20 is indicated at 22, this portion being formed rigidly with the element 21 and being arranged substantially at right angles therewith. The portion 22 may be formed either as a tube or as a rod, as it is unnecessary that this element be provided with a longitudinal bore. It is necessary, however, that it be provided with transverse bores adjacent to each end thereof and parallel to the longitudinal bore of the element 21. These transverse bores, which are not clearly seen in the drawing herewith, are arranged to surround portions of the horizontally disposed elements 10 of the other (unshaded) electrode. The elements 10 so passing through the bores near the ends of the insulating element portion 22 are at different levels in the electrode structure and are in different vertical planes. Thus, the portion 21 of the insulating support 20 is disposed horizontally in the normal position of the entire capacitor; while the portion 22 thereof is disposed at an incline to the vertical, but still perpendicular to the portion 21. This positively positions the elements 10 with respect to the element 13, except in a direction axial of the elements 10. This last possible movement is prevented, however, by the provision of spacers 23. Each of the spacers 23 is formed as a tubular element and surrounds a portion of one of the wire-like elements 10 and also extends between one of the intersections of such element 10 with one each of the other wires 11 and 12 on the one hand (at the right as seen in Fig. 2) and a part of the inclined portion 22 of the spacer element 20 (at the left, Fig. 2). This prevents any movement of the element 20 with respect to the electrode including the wire-like elements 10, and vice versa. It is contemplated that the spacers 23 may be of any suitable material, including not only insulating material as aforesaid, which is presently preferred, but also metallic and conducting materials.

It will be understood that a plurality of inside supporting means, each corresponding generally to that just described, may be used in making up a complete electrode structure as herein defined.

It is further contemplated that the type of supporting means shown in Fig. 2 and just described may be used, not only in multiple with other similar insulating supporting means, but also in conjunction with insulating supporting means of the type described with respect to Fig. 1, and shown at 16 in that figure.

Figure 3:
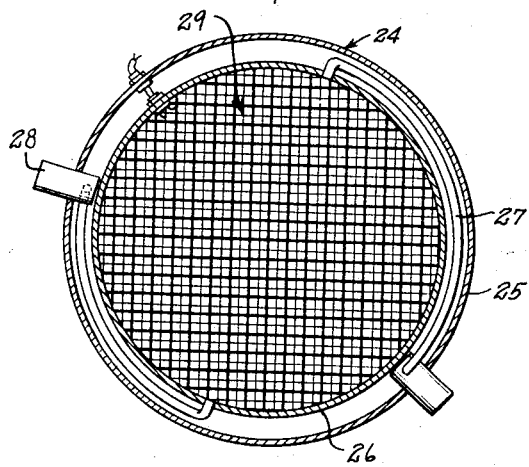
Fig. 3 is a view substantially in transverse section of a container for a liquifiable gas, such as oxygen, with a capacitor means according to the present invention associated therewith, illustrated in a manner similar to that of Fig. 1.

Referring now to Fig. 3, there is illustrated in transverse section a part of a container for a liquified gas such as liquid oxygen, this container being generally shown at 24 and being made up of a double walled vessel including an outer wall 25 and an inner wall 26. As shown, the container is provided with an inlet passage 27 and an outlet passage 28, each of which may be provided with suitable valve means (not shown). Also, the space between the inner and outer walls 25 and 26 may be suitably evacuated and/or filled with insulating material, these details forming per se no necessary part of the present invention.

In accordance with this invention, the entire interior of the container, and particularly of the inner container wall 26 is filled with a capacitor structure generally indicated at 29, which may be built up substantially in the same way as above described for the form of the invention shown in Figs. 1 and 2 as to the constructions of the two electrodes. Assuming that the view in Fig. 4, which is an enlarged view of a portion of that in Fig. 3, may be considered a view in a horizontal section so as to be essentially the same as that in Fig. 1, the several wire-like elements used in making up the two electrodes are given the same reference characters (10–15 inclusive) respectively, and the elements 13, 14 and 15 making up one electrode to the extent that these are shown, are shown shaded in Fig. 4 to distinguish them from the elements 10, 11 and 12 making up the other electrode.

In this form of the invention, instead of using so-called "internal" insulating supports as shown, for example, at 16 in Fig. 1 or at 20 in Fig. 2, each of the electrodes is supported independently from the inside of the container in which they are located. For this purpose, the outwardly extending ends of the wires or wire-like elements making up the two electrodes are suitably cut so that they will have a general contour substantially the same as the inner contour of the container in which they are located. These ends may then each be supplied with suitable insulating means formed, for example, as a body of insulating material having the bore only part way therethrough into which an end portion of a wire can extend. As shown particularly in Fig. 4, such means may be substantially spherical in form as shown at 30. It will be understood, however, that the spherical form is not at all essential; but that any other desired form, for example, cylindrical, could be used. Thus these insulating means could be made from cut-off portions of a cylindrical rod drilled part way through from any direction. If then the electrode structure has first been suitably trimmed by cutting the wires down to the right point and the insulating means 30 are of about the same size and drilled to the same extent, it will be seen that each electrode may be independently supported from the interior of the container in which it is located and as such each is supported in a fixed position with respect to the other. In this way, internal insulating spacing means may be unnecessary.

It is further contemplated that some combinations of internal and external spacing means could be used if desired; for example, by using internal spacing means to assure accurate relative positioning of the two electrodes and by spacing the entire capacitor from the container by suitable insulating elements located on the end portions of the elements of one electrode only, for example, while preventing contact between the other electrode and the sides of the container by cutting the ends of said other electrode sufficiently short so that they will not contact the container. Any and/or all these insulating means may be used as desired, the several means being shown and described for purposes of illustration, but not of limitation.

Figure 4:
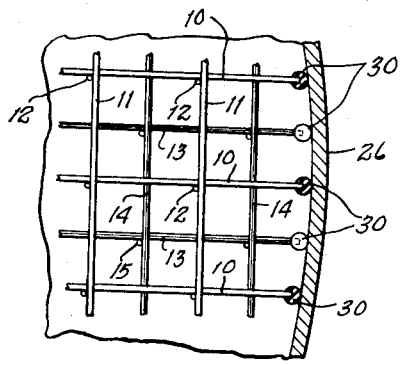
Fig. 4 is a fragmentary view similar to a portion of Fig. 3, but on a greatly enlarged scale, showing another manner of insulating the capacitor elements from the inside of a container, which may in this instance be of electrically conducting material.
Figure 4A:
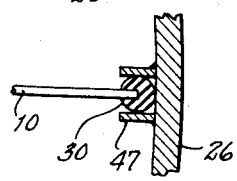
Fig. 4a is a fragmentary view similar to a part of Fig. 4, illustrating another way in which an insulated end of a wire-like element forming a part of one electrode may be anchored with respect to the wall of a tank.

There is illustrated in Fig. 4a a modification of the showing of Fig. 4. In this figure the insulated ends of the wires of wire-like elements are shown provided with insulators 30 as in Fig. 4, except, however, that the insulated ends of the wires may then be received in suitable recesses formed either in the tank wall itself or provided on the tank wall, for example, by welding thereon a short length of tubing 47, which serves to provide such a recess and serves to position the wire-like element therein as shown. By providing a number of these recesses formed either reentrant into the tank wall or thereon as shown in Fig. 4a, both electrodes may be accurately positioned with respect to the tank and thus with respect to each other.

It is also contemplated that when a tank is to be provided with oppositely disposed recesses reentrant thereinto or formed thereon as in Fig. 4a, it will be necessary, in order to install electrodes in the tank, to bend certain at least of the wire-like elements in order to permit their insertion into the oppositely disposed recesses. It may be understood that such bending may be reversed in effect following the installation of the wire-like element by bending each element back to its original form after the ends have been suitably received, as shown, for example, in Fig. 4a.

Another important principle of construction is illustrated in Figs. 3 and 4, i.e. the manner in which electrodes may be made and caused to conform to a predetermined irregular shape. For this purpose, it will be understood that a sufficiently large sized capacitor structure, as taught hereinabove and described in Figs. 1 and/or 2, may first be formed, intended for use, for example, with internal or external insulating support means. Such a structure may be made in a number of conventional shapes and ways, for example, as a rectangular prism which will be larger in some one or more dimensions than the desired shape and size of the space in which it is to be fitted. Once made, this electrode structure, i.e. the two electrodes combined and considered collectively, may then be cut down by cutting off those portions which are not to be needed for a particular installation and the remainder of the structure used in the place for which it is intended. In this way, the entire interior of a container, or such portion thereof as it may be intended to be filled with the electrode structure as herein taught, may be filled with such structure, then the container suitably closed and sealed as is common in this art.

Figure 5:
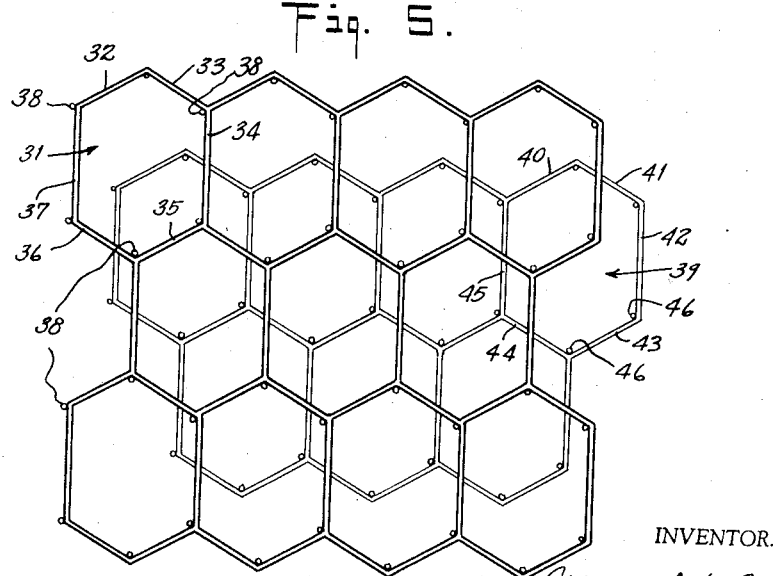
Fig. 5 is a view in elevation showing parts of two electrodes making up an embodiment of the invention different from that shown in previous figures.

Turning now to Fig. 5, there is illustrated a modified form of wire-like three-dimensional lattice also embodying the present invention. In this form, wire-like elements are formed into a honeycomb-like structure including hexagonal cells which are contiguous with one another, these cells being shown, for example, at 31 and including sides 32–37 inclusive. Assuming for purposes of description that the showing of Fig. 5 is a view in elevation as generally described above, then the honeycomb shape cells including cells as 31, and including the sides 32–37 thereof and similar contiguous cells, all lie in a vertical plane as shown in this figure, the plane being that of the paper in which the figure is drawn. It will be understood that other and similar honeycomb-like networks are located in other planes parallel to the plane of the paper and both below and/or above such plane, assuming the paper to be lying in a horizontal plane. These honeycomb-shaped wire elements or networks thereof are interconnected with one another by wire-like elements 38, which would extend horizontally (assuming that Fig. 5 is a view in elevation) and which are shown as perpendicular to the plane of paper in the view given. The several wire-like elements are all in electrically conductive contact with one another, which may be effected in any one of the ways described above as to the elements making up the electrodes in the forms of the invention in Fig. 1 or 2.

The second of the two electrodes in this form of the invention may be similarly made up of vertically disposed wire-like elements arranged in honeycomb shape and disposed in a plurality of parallel vertical planes, each parallel to the plane of the paper as seen in this view. Such other elements may, for example, include a cell 39 including sides 40–45 inclusive. Again, as to this electrode, the several honeycomb-like networks which lie in parallel vertical planes are interconnected by wire-like elements 46 perpendicular to such planes.

In this way, two similar electrodes are provided in which the wire-like elements of one are respectively between the corresponding wire-like elements of the other and respectively substantially parallel thereto. The arrangement further complies with the requirement for an electrode structure according to the present invention in that not only are predetermined volumetric space occupied by the two electrodes considered as a single capacitor, but there will be a substantially constant increment of electrical capacitance for each unit of volume of this predetermined volumetric space.

It will be understood that other arrangements, not necessarily using straight wires or wire-like elements with straight sections, but possibly including the use of curved wires or wires with curved sections, may be made up which will comply with the basic requirements set out hereinabove for the present invention and which will, therefore, be equivalent to the forms herein particularly illustrated and described. All such variants are to be considered within the purview of this invention.

Furthermore, the capacitor of the present invention may be arranged electrically to form a part of a circuit system of any known type usable with a capacitor for sensing the amount of fluid in a container. One such system is illustrated, described and claimed, for example, in a reissue patent to Edelman Re. 23,494, reissue date May 20, 1952. Another type of circuit system capable of alternatively indicating by weight or volume, the content or amount a liquid in a container and usable with the electrode structure of the present invention is illustrated in a patent to Campani No. 2,738,673, granted March 20, 1956. These two patented structures are merely illustrative of circuit systems with which the capacitor of the present invention may be used and are not intended as limiting upon such use. Inasmuch, however, as circuits for use with a capacitor built in accordance with the present invention have been known for some time, it has been thought unnecessary to illustrate such circuits or to describe them in detail herein.

While it has been attempted, as the present description proceeded, to describe not only the particular devices illustrated and their utility, but also to set out equivalents as they are now known, it is recognized that other equivalents will occur to those skilled in the art from a detailed consideration of the present description and the accompanying drawings. I do not wish to be limited, therefore, except by the scope of the appended claims, which are to be construed validly as broadly as the state of the prior art permits.

What is claimed is:

1. Capacitor means for sensing the amount of non-gaseous fluid in a predetermined volumetric space in a container in a manner independent of the attitude of the container, comprising one electrode made up of a plurality of wire-like elements arranged in a three-dimensional lattice with said elements connected electrically together and with said elements collectively extending in three dimension throughout said volumetric space, a second electrode made up of a plurality of wire-like elements arranged in a three-dimensional lattice and with the elements of said second electrode connected electrically together with said elements of said second electrode collectively extending in three dimension throughout said volumetric space, the elements of each said electrode being disposed between and out of electrical contact with the elements of the other of said electrodes respectively, each of said electrodes substantially filling said predetermined volumetric space of said container, while permitting free flow of the non-gaseous fluid throughout said predetermined volumetric space except for the spaces occupied by the wire-like elements making up said electrodes; and said electrodes being so constructed and arranged as to provide a substantially constant increment of electrical capacitance for each unit of volume of said predetermined volumetric space.

2. Capacitor means in accordance with claim 1, in which each of said electrodes is similar to the other, and the wire-like elements making up one of said electrodes are disposed substantially midway between the corresponding elements making up the other of said electrodes respectively; said electrodes each being constructed and arranged so as substantially to fill the entire interior of the container in which said electrodes are located.

3. Capacitor means in accordance with claim 1, in which each electrode occupies substantially the entire interior space in the container in which these electrodes are located; and in which the wire-like elements of which each electrode is formed are substantially rigid and are maintained in predetermined positions in said container and with respect to each other by insulators extending between portions of each electrode and the walls of said container.

4. Capacitor means in accordance with claim 1, further comprising a plurality of non-conducting spacing means mechanically interconnecting parts of said electrodes so as to hold the wire-like elements of which said electrodes are formed in substantially predetermined spaced relation to each other, said non-conducting spacing means each comprising a cross-shaped member formed of two intersecting portions and having one of said portions provided with a hole axially therethrough to accommodate a wire-like element of one of said electrodes, the other of said portions having spaced holes laterally therethrough substantially parallel to the first-named hole, each of the last-named holes being adapted to accommodate wire-like elements of the other of said electrodes; and a pair of hollow tubular spacers respectively surrounding the respective wire-like elements extending through one of said last named holes and holding said cross-shaped member in a predetermined position with respect to the said other of said electrodes, the first-named portion of the cross-shaped member through which a wire-like element of the first-named electrode extends having such length as to serve as spacing means to prevent relative movement between said cross-shaped element and the first-named electrode.

5. Capacitor means for sensing the amount of non-gaseous fluid in a predetermined volumetric space in a container in a manner independent of the attitude of the container, comprising one electrode made up on a plurality of straight wire-like elements arranged in a three-dimensional lattice with said elements connected electrically together, a second electrode made up of a plurality of straight wire-like elements arranged in a three-dimensional lattice and with the elements of said second electrode connected electrically together, the elements of said second electrode being disposed between and out of electrical contact with the elements of said first electrode; each of said electrodes being made up so that in one position of each said electrode, one group of said elements extends horizontally and from side to side, a second group of said elements extends horizontally and perpendicular to the elements of said one group, and a third group of said elements extends vertically, said elements being so spaced from one another as substantially to bound spaces in the form of rectangular prisms, the edges of which are defined by said elements; each of said electrodes substantially filling said predetermined volumetric space of said container, while permitting free flow of the non-gaseous fluid throughout said predetermined volumetric space except for the spaces occupied by the wire-like elements making up said electrodes; and said electrodes being so constructed and arranged as to provide a substatnially constant increment of electrical capacitance for each unit of volume of said predetermined volumetric space.

6. Capacitor means in accordance with claim 5, in which each of said electrodes is substantially similar to the other, and in which the wire-like elements of which each electrode is formed are disposed substantially midway between the respectively corresponding elements of the other of said electrodes.

7. Capacitor means for sensing the amount of non-gaseous fluid in a predetermined volumetric space in a container in a manner independent of the attitude of the container, comprisng two electrodes, each of which is made up of wire-like elements arranged in a three-dimensional lattice with the elements of each electrode electrically connected together but electrically out of contact with the elements of the other electrode, the wire-like elements of each electrode being formed to provide a plurality of honeycomb-shaped networks disposed in parallel planes and connected together by other wire-like elements which are disposed at an angle to said planes and which intersect and are electrically connected with the wire-like elements of said networks in said planes; each of said electrodes substantially filling said predetermined volumetric space of said container, while permitting free flow of the non-gaseous fluid throughout said predetermined volumetric space except for the spaces occupied by the wire-like elements making up said electrodes; and said electrodes being so constructed and arranged as to provide a substantially constant increment of electrical capacitance for each unit of volume of said predetermined volumetric space.

8. Capacitor means in accordance with claim 7, in which the planes containing the honeycomb-shaped networks of one of said electrodes are disposed respectively between the corresponding planes containing the honeycomb-shaped networks of the other of said electrodes; and in which the wire-like elements connecting the honeycomb-shaped networks in the several planes for each electrode are disposed substantially perpendicular to said planes.

9. Capacitor means for sensing the amount of non-gaseous fluid in a predetermined volumetric space in a container in a manner independent of the attitude of the container, comprising two electrodes, each of which is made up of spaced-apart conductive wire-like elements disposed in three directions, each extending at right angles to the other two, and in which the wire-like elements of each electrode define the edges of predetermnied similar rctangular prisms; said electrodes being substantially similar to each other and planes defined by perpendicularly disposed elements of one being spaced apart from the planes defined by corresponding elements of the other, so that each unit of volume making up said volumetric space will be substantially equally occupied by portions of both said electrodes and so that the electrical capacitance of said capacitor is substantially equally affected by each unit of volume of said predetermined volumetric space; and means connecting the wire-like elements of each of said electrodes together in an electrically conductive manner at all crossing points of such wire-like elements within each of said electrodes respectively.

10. Capacitor means for sensing the amount of non-gaseous fluid in a container independent of the attitude of said container, comprising one electrode made up of a plurality of wire-like elements arranged in a three-dimensional lattice with said elements connected electrically together, a second electrode made up of a plurality of wire-like elements arranged in a three-dimensional lattice and with the elements of said second electrode connected electrically togther, the elements of said second electrode being disposed between and out of electrical contact with the elements of said first electrode; each of said electrodes substantially filling said container, while permitting substantially free flow of the non-gaseous fluid throughout said container; and said electrodes being so constructed and arranged as to provide a substantially constant increment of electrical capacitance for each unit of volume of said container; the wire-like elements making up each of said electrodes being substantially rigid; insulating means mechanically spacing the wire-like elements of each electrode from the other and holding these elements of each electrode in predetermined positions with respect to those of the other; the wire-like elements of each electrode being cut off to provide an outer contour for both said electrodes collectively corresponding substantially to the contour of the inside of said container, so that both electrodes occupy substantially the entire space within said container; and means electrically insulating portions of each of said electrodes adjacent to the walls of said container from other conductive material.

11. Capacitor means in accordance with claim 10, in which said means electrically insulating portions of said electrodes from other conductive material comprise insulating means covering the extremities of the conductive elements of each said electrode adjacent to the walls of said container.

References Cited in the file of this patent

UNITED STATES PATENTS 2,683,371     Droin                  July 13, 1954

FOREIGN PATENTS 481,103     Great Britain           Feb. 28, 1938
938,646     France                 Apr. 12, 1948